(12) United States Patent
Harris (10) Patent No.: US 8,414,127 B2
(45) Date of Patent: Apr. 9, 2013

(54) METHOD OF MAKING AND PRESCRIBING TINTED LENSES

(75) Inventor: David Andrew Harris, Folkestone (GB)

(73) Assignee: ChromaGen Vision LLC, Kennett Square, PA (US)

( * ) Notice: Subject to any disclaimer, the term of this patent is extended or adjusted under 35 U.S.C. 154(b) by 49 days.

(21) Appl. No.: 13/076,756

(22) Filed: Mar. 31, 2011

(65) Prior Publication Data

US 2011/0176105 A1 Jul. 21, 2011

Related U.S. Application Data

(63) Continuation-in-part of application No. 11/827,893, filed on Jul. 13, 2007, now Pat. No. 7,931,369.

(51) Int. Cl.
*A61B 3/00* (2006.01)
(52) U.S. Cl. .................................... 351/246; 351/222
(58) Field of Classification Search ............ 351/159.01, 351/159.73–159.77, 222, 233, 234, 242, 351/246
See application file for complete search history.

(56) References Cited

U.S. PATENT DOCUMENTS

| | | | |
|---|---|---|---|
| 3,586,423 A | 6/1971 | Zeltzer | |
| 3,701,590 A | 10/1972 | Zeltzer | |
| 3,731,993 A | 5/1973 | Piringer | |
| 4,160,584 A | 7/1979 | Giles | |
| 4,300,819 A | 11/1981 | Taylor | |
| 4,311,368 A | 1/1982 | Saito et al. | |
| 4,320,940 A | 3/1982 | Mueller et al. | |
| 4,838,673 A | 6/1989 | Richards et al. | |
| 4,998,817 A | 3/1991 | Zeltzer | |
| 5,021,196 A | 6/1991 | Crano et al. | |
| 5,349,397 A * | 9/1994 | Monahan ................ 351/201 |
| 5,369,453 A | 11/1994 | Chen et al. | |
| 5,453,100 A | 9/1995 | Sieloff | |
| 5,574,517 A | 11/1996 | Pang et al. | |
| 5,617,154 A | 4/1997 | Hoffman | |
| 5,846,457 A | 12/1998 | Hoffman | |
| 5,917,573 A | 6/1999 | Davis | |
| 6,089,712 A * | 7/2000 | Harris ................ 351/159.24 |

(Continued)

FOREIGN PATENT DOCUMENTS

| | | |
|---|---|---|
| CA | 2273943 | 11/1998 |
| DE | 2548395 | 5/1976 |

(Continued)

OTHER PUBLICATIONS

International Search Report of PCT/US2007/073973, Mar. 31, 2008.

(Continued)

*Primary Examiner* — James Greece
(74) *Attorney, Agent, or Firm* — Valauskas Corder LLC (57) ABSTRACT

Methods of fabricating and prescribing lenses suitable for color blindness and dyslexia correction are disclosed. The corrective lens may be formed of an optically transparent base material, which is tinted to a desired color for correction by immersion in a colorant dye. The color tinted lens is then tinted by a neutral tint dye to render the lens observable as a regular corrective lens. Prescription of such lenses may be based on a dynamically balanced, or haploscopic, fashion of prescription that comprises selecting a first visual filter from a set of sixteen filters and a second visual filter from the remaining set of fifteen filters, the first for the dominant eye and the second for non-dominant eye.

4 Claims, 5 Drawing Sheets

U.S. PATENT DOCUMENTS

| | | |
|---|---|---|
| 6,135,595 A | 10/2000 | Takeshita et al. |
| 6,145,984 A | 11/2000 | Farwig |
| 6,149,270 A | 11/2000 | Hayashi |
| 6,505,935 B2 | 1/2003 | Ayoub |
| 6,811,258 B1 | 11/2004 | Grant |
| 6,984,038 B2 | 1/2006 | Ishak |
| 7,059,719 B2 | 6/2006 | Asher |
| 7,093,935 B2 | 8/2006 | Parnell |
| 7,147,326 B2 | 12/2006 | Künzler et al. |
| 2002/0055007 A1 | 5/2002 | Soane et al. |
| 2003/0076474 A1 | 4/2003 | Wang et al. |

FOREIGN PATENT DOCUMENTS

| | | |
|---|---|---|
| EP | 0943117 B1 | 3/2003 |
| JP | 2000-047145 | 2/2000 |
| WO | WO-98-25173 | 6/1998 |
| WO | WO-2006-110306 | 10/2006 |

OTHER PUBLICATIONS

"ColorView What a Wonderful World", LINK: http://www.color-view.com/products/php.

\* cited by examiner

METHOD OF MAKING AND PRESCRIBING TINTED LENSES

This is a continuation-in-part of co-pending U.S. patent application Ser. No. 11/827,893, filed on Jul. 13, 2007, the entirety of which is incorporated herein by reference.

BACKGROUND

Currently available techniques for correcting color discrimination results in providing individually tinted lenses for a patient's eyes. The corrective lenses of different color tint indicate the purpose of the correction to observers and results in a cosmetically unacceptable appearance. To render the appearance more acceptable, U.S. Pat. No. 6,089,712 discloses a lens of this type, where a central portion of the lens is tinted with the desired color correction for the individual eye and the outer surface of the lens is coated with a mirrored reflective material to make the color tinting invisible to an outside observer. The technique described in the '712 patent provides the desired color correction. However, the presence of the mirror reflective surface on the lens has been found to be cosmetically unacceptable or impractical to some. The mirrored surface may reflect such a high percentage of light that the spectacles may produce an image that is too dark for the wearer. In a certain environments, such as offices or spaces with insufficient light, wearing mirrored glasses may be ineffective and, perhaps, even inappropriate.

In the field of ophthalmology, it has been found that by providing lenses which selectively filter the incident light in the visible region of the spectrum, e.g., from about 650 nm (red region) to 475 nm (blue region), particularly in the shorter (blue) wavelengths, the light received through the lens is thereby modified so as to affect the manner in which it is handled neurologically, by the viewer. Lenses have been produced for patients suffering from color blindness which are individually color tinted for the characteristics of a patient's vision. Such corrective lenses enable the patient to train their optical discernment to perceive colors correctly and also to address many of the symptoms of dyslexia.

SUMMARY

Thus, it is desired to provide color corrective lenses for patients with color blindness or dyslexia to treat the disability but in which the color tints are not discernible to an outward observer and which are not prohibitively costly. According to the methods disclosed herein, fitting of haploscopic filters helps re-synchronize and selectively change the wavelength of each color going into both eyes in a dynamically balanced format. The use of different colors effectively changes the speed of the information in the brain's neurological pathways to enable sufferers of dyslexia or color blindness to improve their reading ability, handwriting, and comprehension. The haploscopic filters disclosed herein work by changing the wavelengths of each color going into one or both eyes, which enhances color perception and color discrimination.

The present invention relates to the lens prescription and fabrication arts. It finds particular application in connection with improving color perception for patients who are color deficient, or color blind as it is commonly known, and for alleviating symptoms of dyslexia through a colored lens prescription. They may also be used to improve the ease of reading for those with reading difficulties due to dyslexia or similar disorders. Furthermore, lenses fabricated or prescribed according to the methods disclosed herein may have an application in some neurological diseases, including multiple sclerosis, and also in the partially sighted. Among the benefits are improved productivity, function, reading speed and ability, environmental and social adaptability, improvement in self-esteem and overall well-being in patients.

Although the lenses fabricated according to the methods disclosed herein restrict what portions of the visible spectrum are transmitted, they are not colored in the conventional sense. While they function in a similar way to colored lenses, they do not physically appear colored to outward observers, or non-wearers. The lenses are tinted so as to appear neutral to such observers. Although the outward appearance of a certain color is produced by reflecting light in a portion of the visible spectrum, a neutral appearance or a photo-grey effect, as in the disclosed lenses, is produced by a lens reflecting light equally across the spectrum. Thus, while the clinical element of the lens—the color correction—is retained and the lens functions as a colored lens, to outward observers the lens will appear to have a neutral look. This is a desired effect both clinically and cosmetically, because according to the methods disclosed herein, although the lenses worn by a patient are different for each eye and may employ different color correction, they appear very similar or identical to outward observers.

The methods of the present disclosure thus give a unique way of correcting color blindness in a patient in a manner that disguises the color correction and provides the appearance of regular lenses. The methods of the present invention may be applied to a variety of ophthalmic lenses (lenses though which light is transmitted into a person's eye), including spectacle lenses, soft or rigid contact lenses, clip-on lenses, and binoculars, or other devices using lenses. The ophthalmic lens may also have a prescriptive correction or be uncorrected. It is to be appreciated that the exemplary lens prescription and fabrication methods are not limited to such applications and may find other applications and apply to other purposes for the selective adjustment of light transmission through a lens.

In accordance with one aspect of the exemplary embodiment, a method of fabricating an ophthalmic lens which may be used for correction of color discrimination of a patient, includes forming a lens of relatively open molecular structure material, tinting the lens to a desired corrective color with ophthalmic dye capable of penetrating the lens molecular structure and dyeing the lens with a dye having a neutral appearing tint capable of penetrating the lens molecular structure.

In another aspect, a method of forming an ophthalmic lens includes infiltrating a light filtering material into a body in the shape of the lens, thereafter, infiltrating a mask material into the body, to provide a ratio of a concentration of the mask material to a concentration of the light filtering material which is higher in a first region of the body than in a second region of the body further from a front surface of the body than the first region, whereby the mask material masks a tint imparted to the body by the light filtering material.

In yet another aspect of an exemplary embodiment, a method of prescribing ophthalmic lenses is provided. Such method includes the steps of determining a dominant eye from a first eye and a second eye, presenting each lens from a first set of lenses to the dominant eye of the patient, selecting a first optimum lens for the dominant eye from the first set of lenses, introducing each lens from a second set of lenses to the non-dominant eye of the patient, wherein the second set of lenses is the first set of lenses without the first optimum lens, choosing a second optimum lens for the non-dominant eye from the second set of lenses, and fabricating an apparatus with the first optimum lens and the second optimum lens for wearing by the patient.

In still another aspect of an exemplary embodiment, a method of treating lenses is provided. Such method includes the steps of saturating a lens body with light filtering material and tinting an outward lens surface with mask material which causes the outward lens surface to appear neutral in color to observers. These as well as other aspects and advantages will become apparent to those of ordinary skill in the art by reading the following detailed description, with reference where appropriate to the accompanying drawings.

DETAILED DESCRIPTION

The present disclosure relates to a lens and to a method of making and prescribing such lenses. The lenses may be used for correcting the inability of a person to perceive colors properly or color blindness or to alleviate many of the symptoms of dyslexia in a patient. The exemplary lens filters light transmitted through the lens to provide filtered light which is tailored to the patient's vision. The lens may include an optically transparent base material in which a light filtering material is dispersed. The light filtering material may be a color tint dye or combination of two or more color tint dyes.

The light filtering material is not visible to an outward observer. Its appearance is masked by a masking material. The masking material may comprise a neutral tint dye, e.g., one with a slight blue, brown, or gray tint. The masking material may be dispersed in the base material and is preferably concentrated more highly toward the surface of the lens. As a result, the neutral tint predominates, masking any filtering material to the outward observer.

To determine the precise color tint dye or combination of dyes to be used, a patient undergoes a fitting procedure whereby, with both eyes open, lenses are held one at a time over the dominant eye while the patient looks at written material, with the patient choosing the preferred lens by a forced choice system. Then, with the chosen lens over the dominant eye and both eyes open, the remaining lenses are shown to the patient, and the patient is forced to choose the preferred lens from the remaining lenses for the second eye.

In one aspect of the exemplary embodiment, different lenses with different color tints may be provided for each eye. However, each lens is such that the color corrective tint is not visible to an outside observer, resulting in a lens that is substantially indistinguishable from ordinary or vision-correcting lenses.

Figure 1:
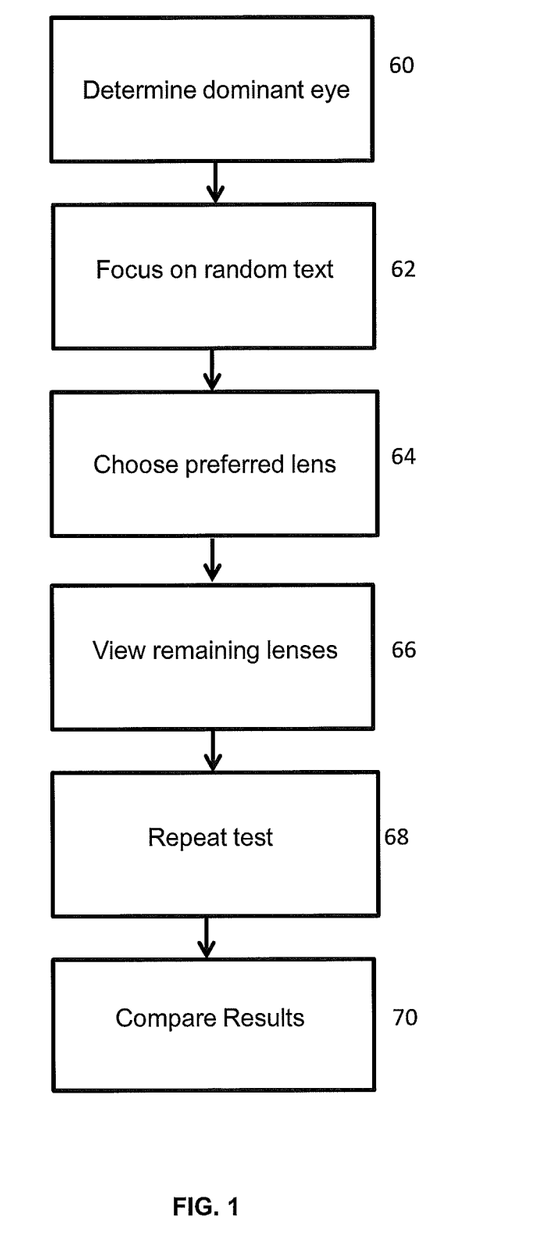
FIG. 1 is a flow diagram of a method of the present disclosure.

Referring to FIG. 1, an exemplary method of prescribing a lens with the proper color correction involves giving a subject a reading speed and accuracy assessment test. This assessment may be according to the Wilkins Rate of Reading test, which is well known and documented in the art. As a preliminary part of the assessment, it is also desired that the dominant eye be determined in binocular patients at step 60. Binocular patients are individuals who engage both eyes. In practice, this determination may be made using a free choice system. To that end, an apparatus such as a telescope may be used. The telescope may be a simple, one-foot tube constructed of cardboard or heavy paper, or another similar device. The patient may then be directed to view a distant object monocularly through the telescope. The subject, given a free choice, will choose to hold the telescope to its dominant eye. Whichever eye the subject chooses to look through the telescope is recorded as the dominant eye. The subject is then given randomized text on which to focus at step 62. The text may be printed on a sheet of paper, projected onto a wall, or otherwise provided to the patient. Then with both eyes open and focusing on the text that is presented to the subject, preferably in front, the subject is shown a series of sixteen colored lenses, in paired fashion, over the dominant eye only, and asked to choose the preferred lens at step 64. Thus, the subject goes through each lens in the series of sixteen lenses and picks the lens that is optimum for the dominant eye. Each lens is preferably presented to the subject in paired fashion, that is, in pair with another lens in the series. The lenses are selected from equidistant points across the visible spectrum. That is, the lenses used for the diagnostic set transmit light at approximately sixteen (16) equally spaced points across the visible spectrum, approximately 390 nm to 750 nm although there is a slight bias toward the shorter (blue) end of the visible spectrum.

Then, with the optimum lens over the dominant eye and with both eyes open, the subject is shown each of the remaining fifteen colored lenses in the series over the non-dominant eye at step 66. The remaining fifteen lenses may, likewise, be presented to the subject in a paired fashion. And the subject will, again, make a forced choice as to the optimum lens in the series of lenses for the non-dominant eye. Finally, the subject will repeat the reading speed and accuracy assessment at step 68 and the result will be compared with the original result at step 70. Thus, according to an exemplary embodiment of prescribing a lens with proper color correction, each eye will have a different optimum lens from the series of sixteen colored lenses.

A commercially available diagnostic set of sixteen lenses may be used for such assessments. The spectral transmission of each lens determines its unique characteristics but the lenses may be labeled with corresponding numbers or codes to be easily differentiated. For example, a diagnostic set may have the following lenses:

|    | Transmission Wavelength | Lens Code |
|----|-------------------------|-----------|
| 1  | 400 nm                  | V100      |
| 2  | 650 nm                  | O100      |
| 3  | 570 nm                  | Y100      |
| 4  | 480 nm                  | A100      |
| 5  | 730 nm                  | M100      |
| 6  | 700 nm                  | P100      |
| 7  | 550 nm                  | G100      |
| 8  | 450 nm                  | B100      |
| 9  | 430 nm                  | B200      |
| 10 | 460 nm                  | B300      |
| 11 | 440 nm                  | B400      |
| 12 | 610 nm                  | Y200      |
| 13 | 560 nm                  | G200      |
| 14 | 420 nm                  | V200      |
| 15 | 520 nm                  | G200      |
| 16 | 680 nm                  | R200      |

An exemplary method of making a lens according to the present invention provides for tinting a corrective lens of sufficiently open or spaced molecular structure to provide the desired color correction. To tint a lens, or to allow the absorption of color tint dye into a lens, the dye may be heated. Whether or not a dye needs to be heated and for how long, depends largely on the particular dye used. Commercially available dyes that require heating come with instructions for heating and appropriate temperatures; usually, the dye is heated to 80° C. or higher. The color tint dye acts as a filtering material in the lens. The color tinted lens may then be dyed with a neutral tint dye to give it the outward appearance of an ordinary lens, or of a lens which is lightly tinted as in a pair of sunglasses.

In an exemplary embodiment according to the present invention, the color tint dye is heated according to the process described immediately above. The heated dye, in turn, heats the lens when the lens is brought in contact with the heated dye. For example, the lens may be immersed in the dye. The duration of the immersion primarily depends on the color, material and thickness of the lens, among other factors. Thickness is usually dictated by the refractive power of the lens; higher power lenses are thicker. The average immersion time is seven (7) to fifteen (15) minutes. The lens is thus heated to a suitable temperature for penetration of the color tint dye, typically about 93° C. to 96° C. (200° F. to 205° F.). Heating the lens allows the lens to become permeable to the color tint dye. The same procedure is then repeated for the neutral tint dye. Once the lens has cooled down, typically about two (2) minutes, it is brought in contact with neutral tint dye, which may also be heated. Heating neutral tint dye follows the same process as that described above with reference to color tint dye. The neutral tint dye works as a mask material to mask the color corrective properties of the lens to an outside observer. The rate of penetration of the dye depends largely on the dye concentration, temperature of the dye, and the length of time the lens is exposed to the dye.

Other methods of infiltrating the filtering material and mask material are contemplated. In another aspect of the present invention, the filtering material and mask material are sequentially infiltrated into the lens base material under vacuum or by lamination.

The filtering material (color tint dye) may be any suitable material for modifying the transmittance spectrum of visible light transmitted through the lens. In general, the visible spectrum ranges from about 400 to 700 nm. The filtering material may be one which modifies the transmission of light in at least a region of the spectrum between 400 nm and 700 nm, e.g., by selectively absorbing a predominant portion of the light within a selected wavelength range of the visible spectrum (e.g., the filtering material prevents transmission of at least 50% of the light in the selected wavelength range). A lens comprising the filtering material may transmit substantially all light in wavelengths that are outside the selected range (e.g., at least 80% of the light outside the selected range is transmitted). The filtering material may comprise a color tint dye with a peak light absorption within the 650-475 nm range, such that light transmitted by the lens has a red, blue, or green cast when viewed by an ordinary observer who does not suffer from color blindness.

However, for a person with color blindness, the modified light allows the patient to view certain colors more easily. For example, in the case of a lens which incorporates a red-transmitting filtering material, the light transmitted may have a transmittance cut off at about 600 nm, with wavelengths from about 600-650 nm being predominantly transmitted and wavelengths from about 450-600 nm being predominantly filtered out. The filtering material may give the lens a colored tint that would be clearly apparent to an outside observer (in the absence of the mask material). In the exemplary embodiment, the filtering material is formulated as a penetrant, that is, one which is able to penetrate the molecular structure of the lens body during fabrication. To act as a penetrant the molecules of the dye selected as the filter material may be finely dispersed in a liquid carrier material, such as a solvent, and be of sufficiently small size to penetrate the molecular structure of the lens body. Heating the mixture of the solvent and dye facilitates the penetration of the filtering material into the lens.

The mask material may be a neutral tint dye which is substantially transmissive, that is translucent enough to transmit a significant percentage of incident light, about 60 percent or more, throughout the visible range of the spectrum. In particular, the neutral tint material is one which absorbs light generally evenly over the entire visible range (for example, transmits at least about 80% of the light at wavelengths between 450 and 650 nm).

In the exemplary embodiment, the mask material is formulated as a penetrant, that is, one which is able to penetrate the molecular structure of the lens body during fabrication. It is also contemplated by an exemplary embodiment that the lens may be heated before the mask material is applied, thereby becoming more permeable to the particles of the mask material. Likewise, the mask material may be heated, too.

In accordance with an exemplary embodiment, it is preferable that the mask material be concentrated near the outside of the lens. By concentrating the mask material near the outside of the lens, the tint effect of the filtering material is masked to an outside observer and the lens has an appearance of a regular lens. Thus, although the lens restricts transmission of certain portions of the visible spectrum, the lens is not colored in a conventional way. It functions in a similar way to ordinary colored lenses but it does not appear colored to an outward observer, because it has been treated to appear neutral. Outward appearance of a certain color is produced by reflecting light in a portion of the visible spectrum; a neutral outward appearance or a photo-grey effect is produced by the lens reflecting light equally across the spectrum. This allows for provision to subjects of two lenses that appear neutral and, moreover, substantially similar to each other, even when the underlying color corrective property in each of the lenses is different and achieved by using differently colored filter materials.

The neutral tint that is selected as the mask material may have a slight blue, grey, or brown cast when viewed by an outside observer with normal sight, depending on the particular neutral tint that is selected. The mask material is present in the lens at a sufficient concentration to mask any color tint introduced by the filter material. In this way, a pair of lenses worn by a patient, one of which incorporates a filtering material which transmits light predominantly in a first, for example, the red region, and the other which transmits light in predominantly a second, for example, the green region of the visible spectrum may have substantially the same neutral tint appearance to an outside observer.

Exemplary color tint dyes for correcting color blindness are well known, and disclosed, for example, in U.S. Pat. Nos. 3,586,423; 3,701,590; 4,998,817; 6,089,712; and 7059719. Exemplary color tint dyes include azo dyes, catalytic (reactive) dyes and sulfur dyes and those which are permitted for use in contact lenses by the FDA. Exemplary neutral tint dyes include those used in the formation of sunglasses and those which are permitted for use in contact lenses by the FDA.

Furthermore, according to an exemplary embodiment, water-based dyes may be used as masking and/or filtering material. In the case of water-based dyes, the dyes selected for the mask material and filtering material may be hydrophobic to enable the dye molecules to preferentially enter the lens base material, as opposed to remaining in the water in which the dye is mixed. Such dyes may be heated to facilitate their penetration into the lens. Additionally, suitable catalytic dyes for use as the filtering material and mask material may be obtained from Brain Power International, Worcestershire, England.

In accordance with an exemplary embodiment of the present invention, exemplary base materials which may be used for the lens include optically transparent polymeric materials, such as, for example diethylene glycol bis(allyl carbonate), widely known as CR39® composition, polycarbonate, Perspex, combinations thereof, or other lens forming materials. In some embodiments, the base material is one which allows penetration of the filtering material and/or masks material by diffusion and retains the infiltrated materials within the base material. The base material may form a chemical bond with the filter and/or mask material or otherwise hold the molecules of the dye within its three dimensional structure. In general, glass does not permit penetration of filtering materials and mask materials from liquid dye solutions.

In the case of contact lenses, the polymeric material may comprise any suitable lens forming polymer. Such as hydrogel copolymers, which are cross linked polymeric systems that can absorb and retain water in an equilibrium state. Hydrogel copolymers are generally formed by polymerizing at least one hydrophilic monomer and a crosslinking agent. Representative, hydrophilic monomers include: unsaturated carboxylic acids, such as methacrylic acid and acrylic acid; (meth)acrylic substituted alcohols, such as 2-hydroxyethylmethacrylate and 2-hydroxyethylacrylate; vinyl lactams, such as N-vinyl pyrrolidone; and (meth)acrylamides, such as methacrylamide and N,N-dimethylacrylamide. Typical crosslinking agents include polyvinyl, typically di- or trivinyl monomers, such as di- or tri(meth)acrylates of diethyleneglycol, triethyleneglycol, butyleneglycol and hexane-1,6-diol; and divinylbenzene. A specific example of a hydrogel-forming monomer mixture is polymacon, composed primarily of 2-hydroxyethylmethacrylate with a small amount of diethyleneglycol dimethacrylate as a crosslinking monomer. Optionally, the monomer mixture may include a silicone-containing monomer in order to form a silicone hydrogel copolymer. Examples of silicone-containing monomers include: monomers including a single activated unsaturated radical, such as methacryloxypropyl tris(trimethylsiloxy)silane, pentamethyldisiloxanyl methylmethacrylate, tris(trimethylsiloxy)methacryloxy propylsilane, methyidi(trimethylsiloxy)methacryloxymethyl silane, 3-[tris(trimethylsiloxy)silyl]propyl vinyl carbamate, and 3-[tris(trimethylsiloxy)silyl]propyl vinyl carbonate; and multifunctional ethylenically "end-capped" siloxane-containing monomers, especially difunctional monomers having two activated unsaturated radicals. See, for example, U.S. Pat. No. 7,147,326. Many other lens-forming monomers and specific copolymers thereof are well known in the art and are contemplated by this invention.

In an exemplary embodiment, the dye to be used as the filtering material and/or mask material may be infiltrated into the base material of the lens from a solution of the dye in a suitable solvent, such as water or an organic solvent. In other embodiments, the filtering material may be incorporated into the lens material during polymerization of the lens material.

Figure 2:
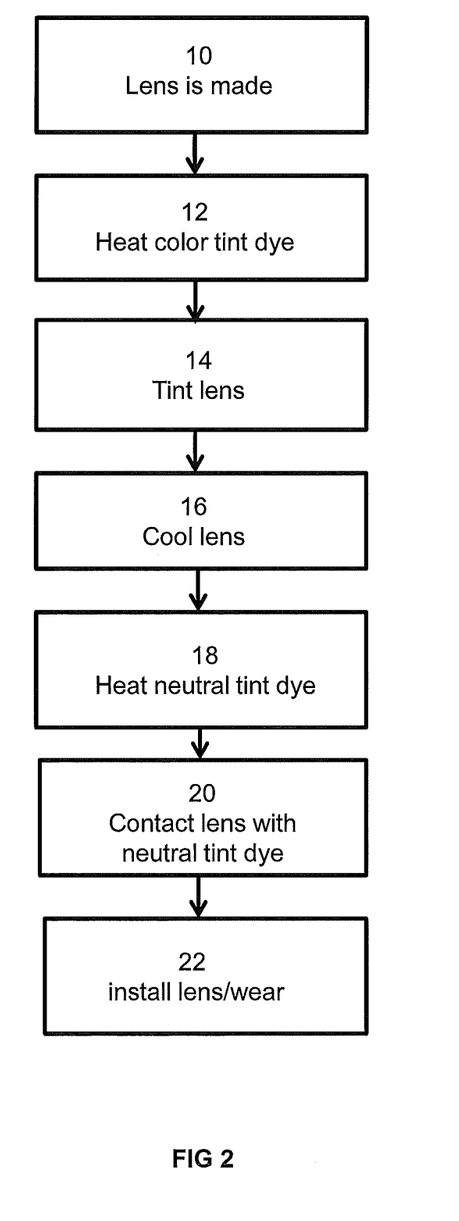
FIG. 2 is a flow diagram of another method of the present disclosure.

Referring to FIG. 2, a method of fabricating the corrective lens is shown by way of example. A corrective lens body for the particular patient's eye is formed at step 10 of an ophthalmic quality transparent base material by any of the techniques known in the art of lens making. The lens may be formed as a spectacle lens or, alternatively, may be formed as a soft or hard contact lens. In some embodiments, the lens may be machined or otherwise shaped to provide a refractive correction, such as a prescriptive correction for short or long sight. In some embodiments, the lens may be formed without any prescriptive correction.

The method then proceeds to step 12 and the dye or solution thereof is heated to a suitable temperature for infiltration of the color tint dye, e.g., a temperature of about 95° C. (205° F.)-118° C. (295° F.). Then, at step 14, the lens base is tinted to the desired corrective color with the color tint dye. The rate of penetration of the dye and/or the amount of the dye which the base material is able to take up may be increase with increasing temperature. In general, the temperature is selected to be below a temperature at which the lens may be damaged through warping, melting or other deformation and below the boiling point of any solvent in which the dye is incorporated. The lens is immersed in the heated color tint dye or otherwise contacted therewith for a sufficient period of time for the dye to infiltrate the base material, such as about 15-30 minutes.

The dye that is selected depends on a specific wearer and his specific color blindness, that is, it depends which colors are being filtered out. Some color tint dyes are readily available and others are a mixture of two or more tints and need to be mixed by a lab technician. A spectrophotometer may be used to assure the quality and consistency of color. After the infiltration of the color tint dye into the lens body, the color tinted lens body is removed from the color tint dye and may be allowed to cool for a period of time sufficient for the lens to cure or otherwise fix the color tint dye within the lens body.

The lens may then be given a period of time to cool at step 16, usually about two (2) minutes. Mask material is then applied to the color tinted lens. For this, the color tinted lens is tinted with a neutral tint dye. At step 18, the neutral tint dye (or solution thereof) may be heated, prior to immersing or otherwise contacting the lens with the neutral tint dye or solution thereof at step 20.

In one embodiment, the infiltration of the filtering material and/or mask material may be conducted at ambient pressure. In other embodiments, the infiltration process may be conducted under a vacuum or by lamination.

Subsequent to the neutral tint dyeing of step 20, the lens is installed in spectacles if a spectacle lens has been made, or worn by the user, if a contact lens was formed, in step 22.

In the case of two lenses to be worn as spectacles or contact lenses, a different filtering material for providing a different corrective color may be used in each lens. In other embodiments, both lenses may incorporate the same filtering material. The same mask material may be used in both lenses.

It is observed and, therefore, contemplated and described by the present invention at FIG. 2 that when the filtering material is permeated into the base material of the lens, it penetrates into the base material from the surface of the lens to at least a first depth. However, the filtering material may also penetrate the lens body entirely, if it is left in contact with the dye for a longer period of time. Thereafter, when the mask material is permeated into the lens that was already treated with the filtering material, the mask material remains predominantly near the surface of the lens. This is because the filter material particles that are already in the lens impede the penetration of the mask material deep into the lens.

The concentration gradients of the mask and filtering materials in the treated lens are thus different. For example, a ratio of the concentration of the mask material to the concentration of the filtering material may be higher nearer the surface of the lens than in a region further from the surface of the lens. The concentration of the mask material may be expressed as total moles of color tint dye per cc of base material. The concentration of the filtering material may be expressed as total moles of the neutral tint dye per cc of base material.

Figure 3:
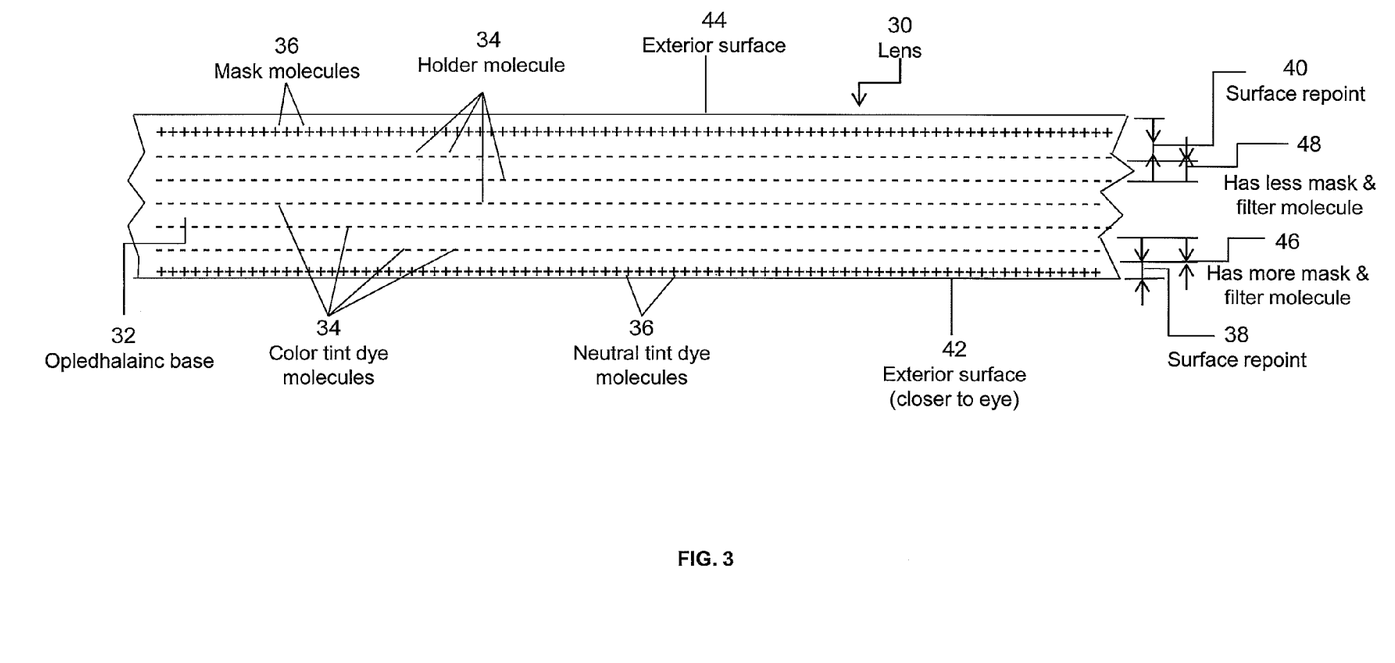
FIG. 3 is a cross-section of a portion of a lens of the present disclosure.

Referring to FIG. 3, a portion of a lens, such as a spectacle lens or contact lens, indicated generally at 30, includes an ophthalmic base 32 formed of a base material with color tint dye molecules 34 dispersed therein (indicated by a "−" sign). Neutral tint dye molecules 36 (indicated by a "+" sign) are dispersed in the base material. The neutral tint dye molecules are concentrated predominantly in one or both of surface regions 38, 40 located adjacent opposed exterior surfaces 42, 44 of the lens. Surface 42 is the rear surface of the lens 30 which is to be positioned closest to the patient's eye, while surface 44 is the front surface of the lens to be positioned furthest from the patient's eye, and thus closest to an outside observer. As noted above, the color tint dye may be an ophthalmic dye with transmissibility of only a desired portion of the visible spectrum or desired chromaticity band while the neutral tint dye may be an ophthalmic dye of even transmissibility across the visible spectrum. The base 32 into which the mask and filter materials are incorporated is integrally formed, as a single piece, without lamination or coating, e.g., by molding, optionally followed by lathing or other shaping.

The color tint dye molecules 34 may be dispersed throughout the lens base material 32 or may be predominantly in regions 46, 48, which are spaced from the lens surfaces by the surface regions 38, 40, respectively. The regions 38 and 40 are thus closer to the respective front and rear surfaces than the respective adjacent regions 46, 48. Regions 38 and 40 extend generally parallel with the respective surfaces 42, 44. Although FIG. 2 illustrates these regions 38, 40 as containing only the mask molecules 36, it is to be appreciated that this region may also contain some of the filter molecules 34, but generally too few, at least near the surface, to impact the neutral tint appearance of the lens.

In the embodiment shown, a ratio of the concentration of the mask material 34 to the concentration of the filtering material 36 is higher in region 40, nearer the surface 44 of the lens, than in adjacent region 48, further from the surface 44 of the lens. Similarly, a ratio of the concentration of the mask material 34 to the concentration of the filtering material 36 may be higher in region 38, nearer the surface 42 of the lens, than in region 46, further from the surface of the lens, although this is not required. In one embodiment, the concentration of the colorant dye 34 is higher in the second region 48 than in the first region 40 (and may also be higher in the region 46 than in region 38). The concentration of the neutral tint dye 36 is higher in the first region 40 than in the respective second region 48 (and optionally also higher in region 38 than in region 46). The desired variation in concentration between the different dyes is achieved by heating the dyes separately in separate tint baths and manipulating the duration of the immersion of a lens in a dye (or other method of contacting a lens and dye) to reach the desired effect.

The distribution of the dye particles within a lens is controlled by time or duration of immersion of the lens in the dye, the size of the dye particles, or the size of the lens matrix. Heating the lens causes the lens to expand and facilitates absorption of the dye. The sequential application of the dyes further helps to control the distribution of the dye. In the preferred embodiment, the color tint dye is applied before the mask material. Therefore, the saturation of the color tint dye particles in the lens prevents over-absorption of the mask material. Usually, the duration of immersion of a lens in color tint dye is longer than duration of immersion in the mask material. Thus, in the exemplary embodiment, there is a higher concentration of color tint dye in the lens body than at the surfaces. Likewise, there is a higher concentration of mask material at the surfaces than in the lens body.

Figure 4:
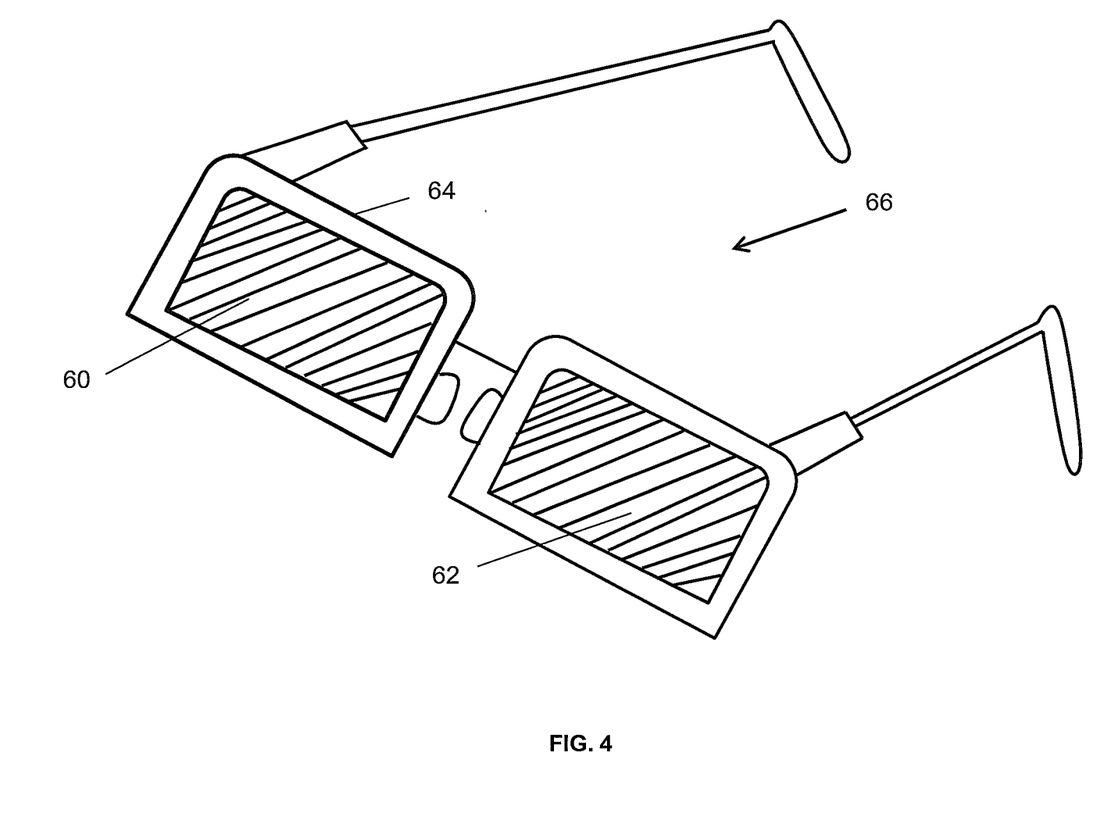
FIG. 4 is an exemplary embodiment configured with spectacles.

Referring to FIG. 4, a pair of lenses 60, 62 of different color tint according to the present disclosure are shown, in an exemplary embodiment as mounted in a frame 64 forming spectacles indicated generally at 66.

In another embodiment, the lens base 32 may be formed by lamination of layers rather than as a single integral layer as shown in FIG. 2. For example, the lens may comprise a first base layer which incorporates the neutral tint dye and a second base layer, to be positioned closer to the wearer than the first base layer. The first base layer may be formed in a separate step from the second base layer, e.g., by forming the first base layer and laminating or coating the second base layer thereto, or vice versa. For example, a separate coating or lamination is applied to a lens for correcting color discrimination, such as a coating with a neutral color appearance, to disguise the underlying color tint of the corrective lenses.

Figure 5:
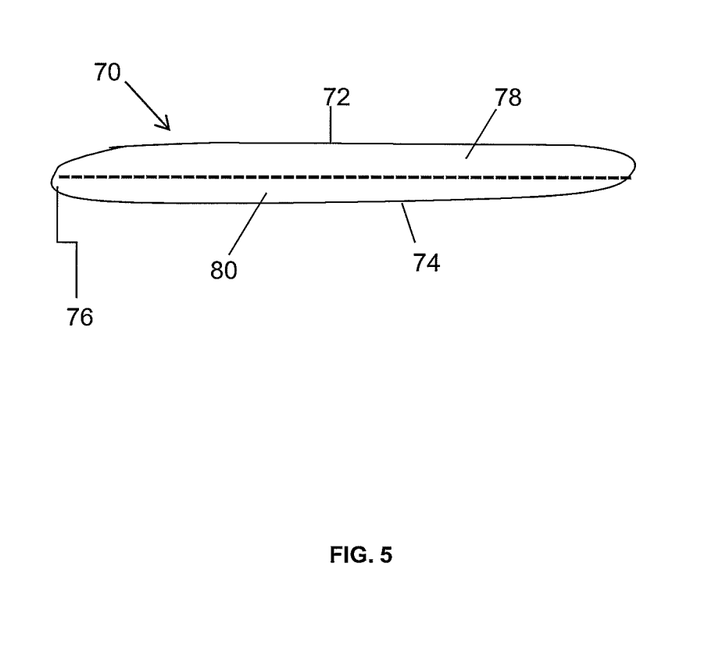
FIG. 5 is an exemplary embodiment configured as a contact lens.

Referring to FIG. 5, an exemplary lens, such as a contact lens is indicated generally at 70 and comprises a front exterior surface 72, curved to be located furthest from the wearer's eye, a rear exterior surface 74, curved to be positioned closest to the wearer's eye and a body 76 intermediate the first and second surfaces. The lens body includes a first region or layer 78, closest to the front surface and a second region or layer 80, spaced from the front surface by the first region. A ratio of the concentration of the mask material 34 to the concentration of the filtering material 36 is higher, on average, in region 78, nearer the front surface 72 of the lens than in region 80, further from the front surface of the lens. Also, a concentration of the colorant dye may be higher in the second region 80 than in the first region 78. A concentration of the neutral tint dye may be higher in the first region 80 than in the second region 78.

The present disclosure thus describes a unique low cost technique for making lenses that may be used for correcting color blindness or alleviating symptoms of dyslexia in a patient, which lenses, when worn either as contacts or in spectacles, give the outward appearance of neutral tinted lenses and the color correction is otherwise indistinguishable from regular corrective lenses.

Various exemplary embodiments have been described above. Those skilled in the art will understand, however, that changes and modifications may be made to those examples without departing from the scope of the claims.

What is claimed is:

1. A method of prescribing lenses for binocular patients comprising:

determining a dominant eye from a first eye and a second eye;

presenting each lens from a first set of sixteen different colored lenses to the dominant eye of the patient;

selecting a first optimum lens for the dominant eye from the first set of sixteen different colored lenses;

introducing each lens from a second set of fifteen colored lenses to the non-dominant eye of the patient, wherein the second set of fifteen colored lenses is the first set of sixteen different colored lenses without the first optimum lens;

choosing a second optimum lens for the non-dominant eye from the second set of fifteen colored lenses; and fabricating an apparatus with the first optimum lens and the second optimum lens for wearing by the patient.

2. The method of claim 1, wherein the determining step further comprises the steps of:
presenting to the patient a monocular object; and
recording the eye that the patient chooses to use the monocular object as the dominant eye.

3. The method of claim 2, wherein the monocular object is a telescope.

4. The method of claim 1, wherein the first set of sixteen different colored lenses consist of lenses with a transmission wavelength of: 400 nm, 650 nm, 570 nm, 480 nm, 730 nm, 700 nm, 550 nm, 450 nm, 430 nm, 460 nm, 440 nm, 610 nm, 560 nm, 420 nm, 520 nm, 680 nm.

* * * * *